US009867123B2

(12) United States Patent
Hashizume

(10) Patent No.: US 9,867,123 B2
(45) Date of Patent: Jan. 9, 2018

(54) WIRELESS COMMUNICATION APPARATUS AND WIRELESS COMMUNICATION METHOD

(71) Applicant: KYOCERA Corporation, Kyoto-shi, Kyoto (JP)

(72) Inventor: Akio Hashizume, Shijonawate (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/976,158

(22) Filed: Dec. 21, 2015

(65) Prior Publication Data
US 2016/0191691 A1 Jun. 30, 2016

(30) Foreign Application Priority Data

Dec. 25, 2014 (JP) ................ 2014-263156

(51) Int. Cl.
*H04W 48/18* (2009.01)
*H04W 8/22* (2009.01)
*H04W 88/06* (2009.01)
*H04L 29/06* (2006.01)

(52) U.S. Cl.
CPC ............ *H04W 48/18* (2013.01); *H04L 69/12* (2013.01); *H04W 8/22* (2013.01); *H04W 88/06* (2013.01)

(58) Field of Classification Search
CPC . H04M 1/72519; H04W 48/18; H04W 88/06; H04W 8/22; H04B 7/0848; H04L 69/12
USPC ... 455/418, 552.1, 432.1, 434, 435.2, 435.3, 455/510, 422.1, 426.1, 432.2, 454, 448, 455/445, 455, 41.2, 41.3, 443; 370/338
See application file for complete search history.

(56) References Cited

U.S. PATENT DOCUMENTS

| 2009/0267952 | A1* | 10/2009 | Yan ............... | H04N 7/163 345/520 |
| 2010/0296427 | A1* | 11/2010 | Lohr ............... | H04L 1/1845 370/312 |
| 2011/0212754 | A1* | 9/2011 | Zurek ............. | H04M 1/605 455/569.1 |
| 2013/0072204 | A1* | 3/2013 | Picker ............ | H04W 88/10 455/450 |
| 2014/0022969 | A1* | 1/2014 | Ryshakov ...... | H04L 47/365 370/311 |

(Continued)

FOREIGN PATENT DOCUMENTS

JP 2004-187002 A 7/2004

*Primary Examiner* — Inder Mehra
(74) *Attorney, Agent, or Firm* — Procopio Cory Hargreaves and Savitch LLP

(57) ABSTRACT

A data processor is configured to perform first processing to acquire data that is included in reception signals received by an antenna and is transmitted in accordance with a first wireless communication scheme and second processing to acquire data that is included in the reception signals and is transmitted in accordance with a second wireless communication scheme. The data processor has, as an operating mode, a first operating mode and a second operating mode. The first operating mode is a mode in which, when the first processing is performed, the second processing is intermittently performed in place of the first processing. The second operating mode is a mode in which, when the first processing is performed, the second processing is intermittently performed in place of the first processing at intervals longer than intervals in the first operating mode.

13 Claims, 7 Drawing Sheets

(56) References Cited

U.S. PATENT DOCUMENTS

| | | | |
|---|---|---|---|
| 2014/0263626 A1* | 9/2014 | Pochic | G06Q 20/341 235/380 |
| 2015/0055642 A1* | 2/2015 | Lee | H04L 12/1859 370/338 |
| 2015/0334673 A1* | 11/2015 | Mathias | H04W 36/30 455/426.1 |
| 2017/0201940 A1* | 7/2017 | Koratekere Honnappa | H04W 52/0206 |

* cited by examiner

F I G . 9
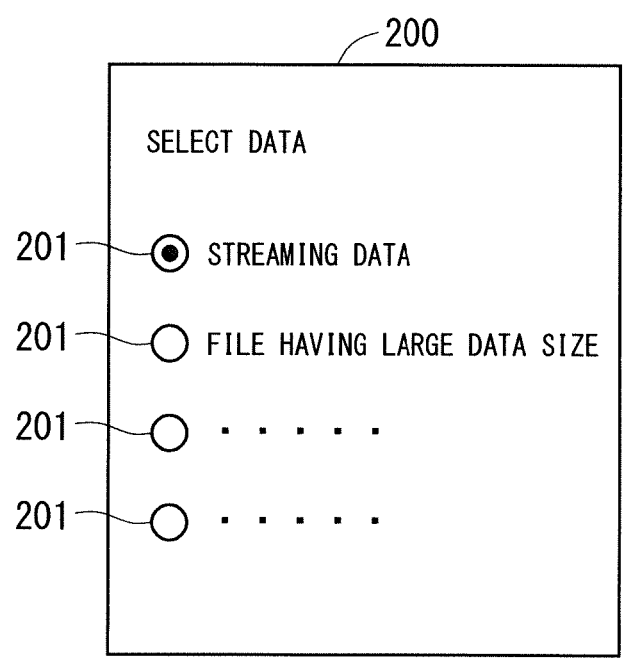

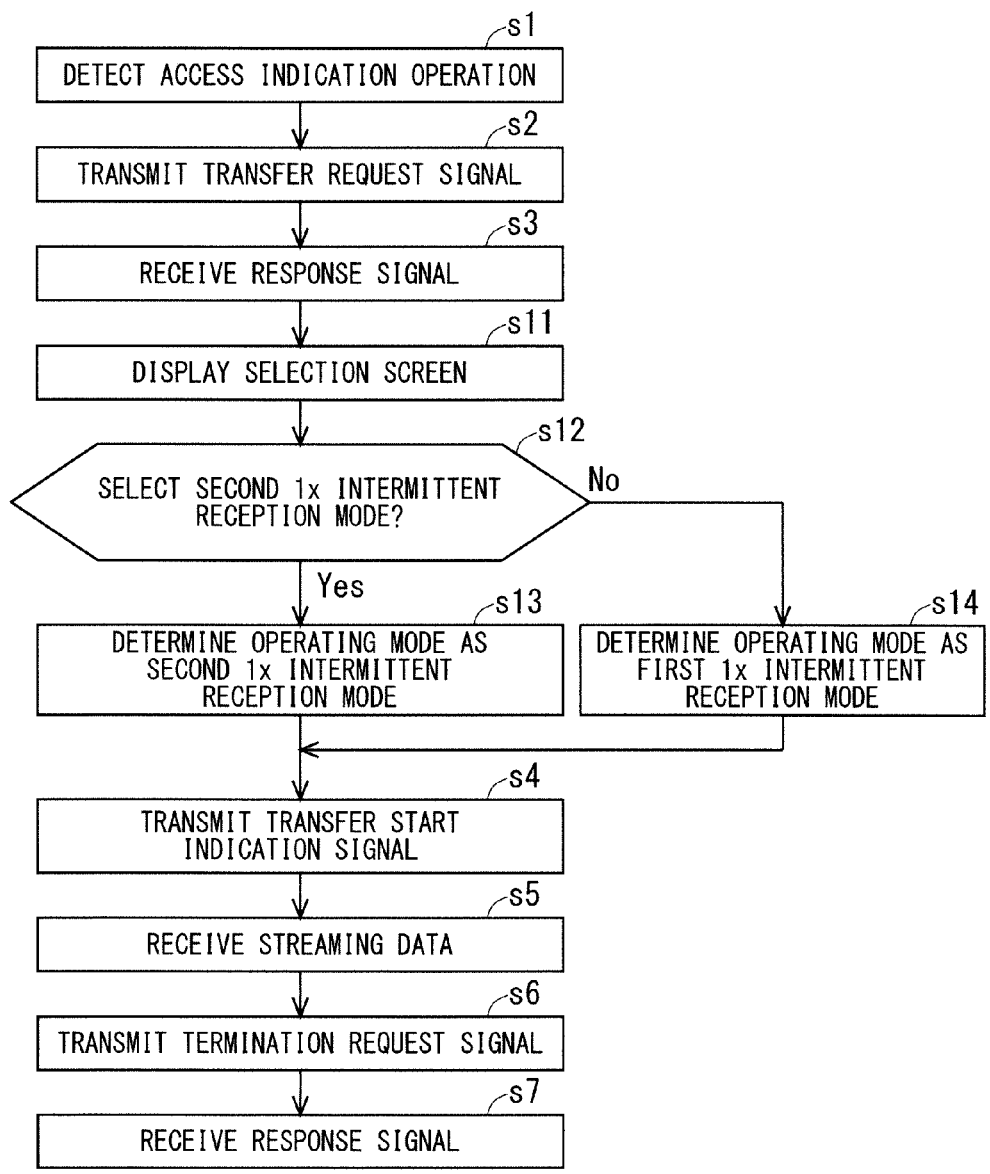
F I G . 1 0

F I G . 1 1
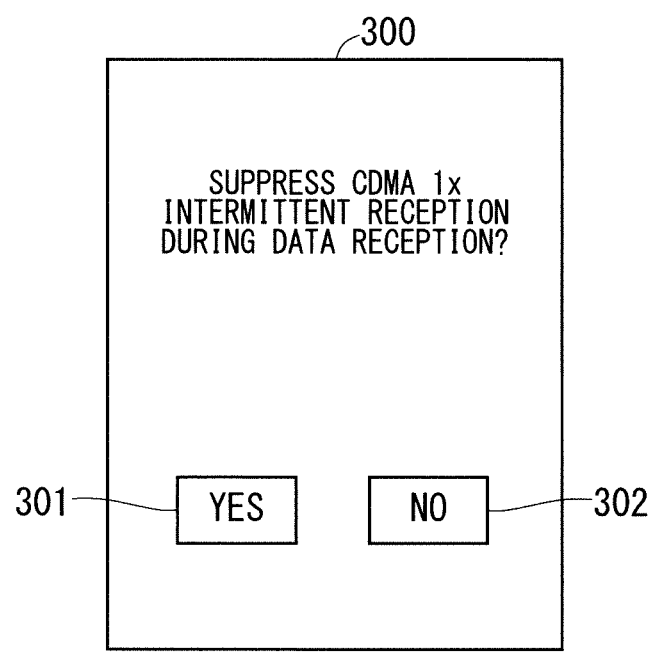

WIRELESS COMMUNICATION APPARATUS AND WIRELESS COMMUNICATION METHOD

CROSS-REFERENCE TO RELATED APPLICATION

The present application claims priority under 35 U.S.C. §119 to Japanese Patent Application No. 2014-263156, filed on Dec. 25, 2014, entitled "WIRELESS COMMUNICATION APPARATUS AND METHOD FOR OPERATING WIRELESS COMMUNICATION APPARATUS". The content of which is incorporated by reference herein in its entirety.

FIELD

Embodiments of the present disclosure relate to wireless communication technology.

BACKGROUND

Various techniques concerning wireless communication have been proposed.

SUMMARY

A wireless communication apparatus and a wireless communication method are disclosed. In one embodiment, a wireless communication apparatus performs communication in accordance with a first wireless communication scheme and communication in accordance with a second wireless communication scheme. The wireless communication apparatus comprises a first antenna and a data processor. The first antenna is shared between reception performed in accordance with the first wireless communication scheme and reception performed in accordance with the second wireless communication scheme. The data processor is configured to perform first processing to acquire data that is included in reception signals received by the first antenna and is transmitted in accordance with the first wireless communication scheme and second processing to acquire data that is included in the reception signals and is transmitted in accordance with the second wireless communication scheme. The data processor has a first operating mode and a second operating mode as operating modes in a case where the wireless communication apparatus is within or out of range of the second wireless communication scheme. The first operating mode is a mode in which, when the first processing is performed, the second processing is intermittently performed in place of the first processing. The second operating mode is a mode in which, when the first processing is performed, the second processing is intermittently performed in place of the first processing at intervals longer than intervals in the first operating mode.

In one embodiment, a wireless communication method receives a first reception signal in accordance with a first wireless communication scheme and a second reception signal in accordance with a second wireless communication scheme. The wireless communication method performs a first mode of intermittently performing, when performing first processing to acquire data that is included in the first reception signal, second processing to acquire data that is included in the second reception signal in place of the first processing. The wireless communication method performs a second mode of intermittently performing, when performing the first processing, the second processing in place of the first processing at intervals longer than intervals in the first mode.

BRIEF DESCRIPTION OF THE DRAWINGS

FIG. 9 illustrates an example of a designation screen;

FIG. 10 illustrates an example of a flowchart showing operation of the wireless communication apparatus; and FIG. 11 illustrates an example of a selection screen.

DETAILED DESCRIPTION

Figure 1:
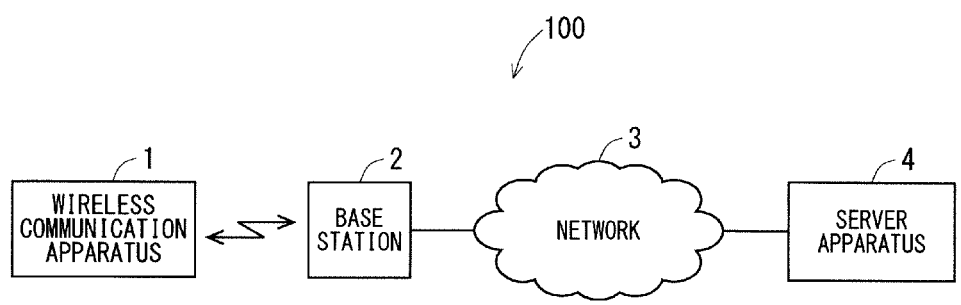
FIG. 1 illustrates an example of configuration of a wireless communication system.

FIG. 1 illustrates configuration of a wireless communication system 100 including a wireless communication apparatus 1. The wireless communication apparatus 1 is, for example, a mobile phone, such as a smartphone. As illustrated in FIG. 1, the wireless communication apparatus 1 performs wireless communication with a base station 2. The base station 2 is connected to a network 3, such as the Internet. The wireless communication apparatus 1 can communicate with a server apparatus 4 and the like connected to the network 3 through the base station 2 and the network 3.

The wireless communication apparatus 1 can perform communication in accordance with a plurality of types of wireless communication schemes. The wireless communication apparatus 1 complies with single radio Long Term Evolution (SRLTE), for example, and can perform communication in accordance with LTE and code division multiple access (CDMA) 2000 1×. Hereinafter, CDMA2000 1× is also simply referred to as "1×". Communication performed in accordance with LTE is also referred to as "LTE communication", and communication performed in accordance with 1× is also referred to as "1× communication".

Although only a single base station 2 is illustrated in FIG. 1, the base station 2 comprises a base station 2 capable of performing both LTE communication and 1× communication, a base station 2 capable of performing only LTE communication, and a base station 2 capable of performing only 1× communication. The wireless communication apparatus 1 can communicate with these three types of base stations 2.

Figure 2:
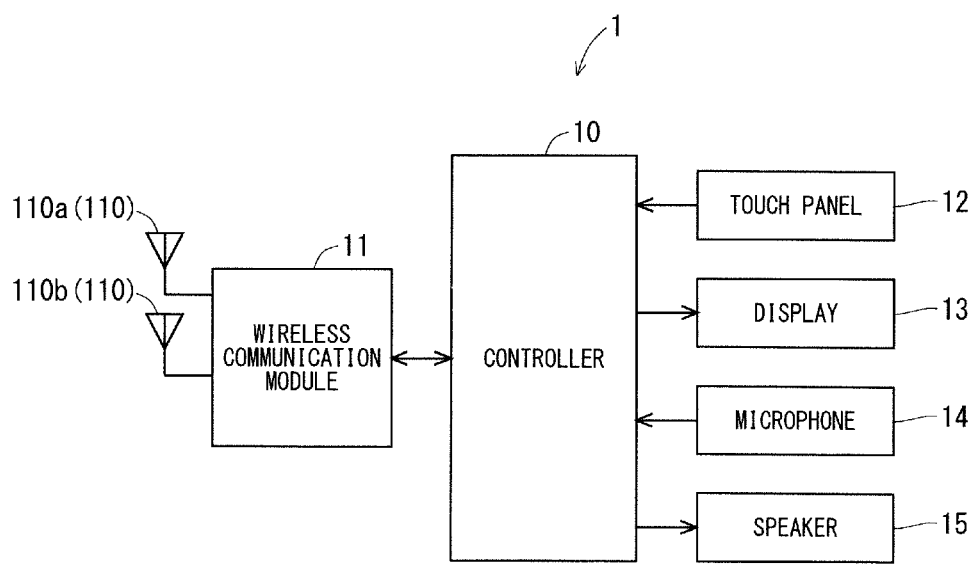
FIG. 2 illustrates an example of configuration of a wireless communication apparatus.

FIG. 2 illustrates configuration of the wireless communication apparatus 1. As illustrated in FIG. 2, the wireless communication apparatus 1 includes a controller 10, a wireless communication module 11, a touch panel 12, a display 13, a microphone 14, and a speaker 15.

The controller 10 can control other components of the wireless communication apparatus 1 to perform overall control of operation of the wireless communication apparatus 1. The controller 10 may be a kind of digital processing circuitry, and includes a central processing unit (CPU), a digital signal processor (DSP), a storage module, and various digital circuits. The storage module of the controller 10 may be configured by read-only memory (ROM), random-access memory (RAM), and the like. Various functions of the controller 10 may be achieved by the CPU and the DSP running various programs stored in the storage module.

The wireless communication module 11 has a plurality of antennas. The wireless communication module 11 includes two antennas 110a and 110b, for example. The wireless communication module 11 can perform wireless communication with the base station 2 using the antennas 110a and 110b. The wireless communication apparatus 1 can perform receiving processing using the two antennas 110a and 110b. On the other hand, the wireless communication apparatus 1 can perform transmitting processing using one of the two antennas 110a and 110b.

The wireless communication module 11 can amplify and down-convert a plurality of reception signals received by the antennas 110a and 110b, for example, to generate a plurality of baseband reception signals in an analog format. The wireless communication module 11 can then convert the generated baseband reception signals in the analog format into baseband reception signals in a digital format, and output the baseband reception signals in the digital format to the controller 10. The controller 10 can perform various types of digital signal processing on each of the baseband reception signals in the digital format as input to acquire user data, control data, and the like included in the baseband reception signals.

The wireless communication module 11 can also convert baseband transmission signals in a digital format generated by the controller 10 and including user data, control data, and the like into baseband transmission signals in an analog format. The wireless communication module 11 can then up-convert and amplify the baseband transmission signals in the analog format as generated, for example, to generate transmission signals in a carrier band. The wireless communication module 11 can wirelessly transmit the generated transmission signals in the carrier band from one of the antennas 110a and 110b. Hereinafter, the antennas 110a and 110b are each referred to as an "antenna 110" unless there is a need to particularly distinguish between them.

The display 13 comprises a liquid crystal panel or an organic EL panel, for example. The display 13 can display a variety of information including characters, signs, and figures through control by the controller 10. The touch panel 12 is a projected capacitive touch panel, for example. The touch panel 12 can detect an operation performed on a display surface of the display 13 with an operator, such as a finger. When a user performs an operation with the operator, such as the finger, on the display surface of the display 13, an electrical signal corresponding to the operation is input through the touch panel 12 into the controller 10. The controller 10 can specify the details of the operation performed on the display surface of the display 13 based on the electrical signal input through the touch panel 12, and perform processing in accordance with the details.

The microphone 14 can convert sound input from the outside of the wireless communication apparatus 1 into electrical sound signals, and output the electrical sound signals to the controller 10. The speaker 15 can convert electrical sound signals from the controller 10 into sound, and output the sound to the outside of the wireless communication apparatus 1.

Figure 3:
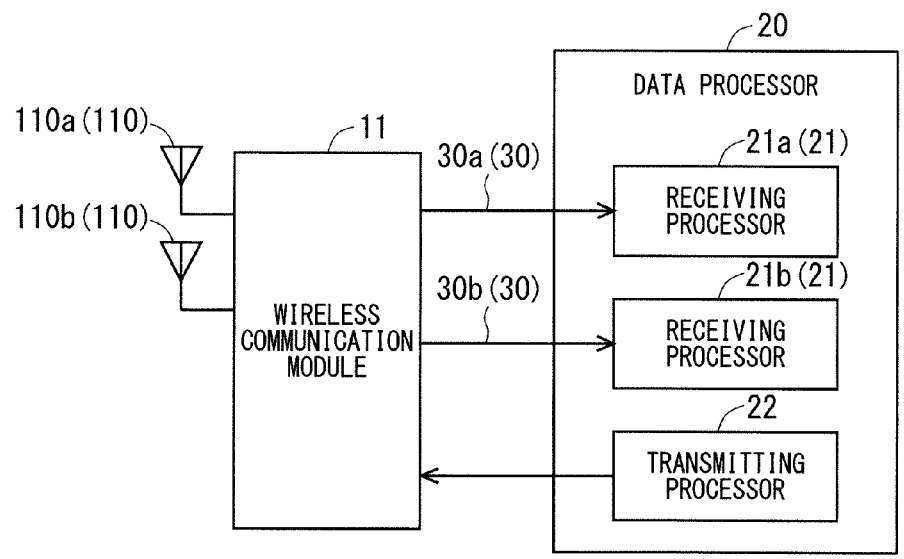
FIG. 3 illustrates an example of configuration of a data processor.

FIG. 3 illustrates configuration of a data processor 20 of the controller 10. The data processor 20 can perform processing to acquire data included in reception signals received by the antennas 110 and processing to generate transmission signals transmitted from the antennas 110 and including data. The data processor 20 includes two receiving processors 21a and 21b and one transmitting processor 22.

As described above, the wireless communication module 11 can convert reception signals received by the antenna 110a into baseband reception signals in a digital format. The baseband reception signals are referred to as "reception signals 30a". The wireless communication module 11 can also convert reception signals received by the antenna 110b into baseband reception signals in a digital format. The baseband reception signals are referred to as "reception signals 30b".

The receiving processor 21a can acquire data included in the reception signals received by the antenna 110a. Specifically, the receiving processor 21a can perform various types of digital signal processing, such as demodulation, on the reception signals 30a output from the wireless communication module 11 to acquire data included in the reception signals 30a.

The receiving processor 21b can acquire data included in the reception signals received by the antenna 110b. Specifically, the receiving processor 21b can perform various types of digital signal processing, such as demodulation, on the reception signals 30b output from the wireless communication module 11 to acquire data included in the reception signals 30b.

The transmitting processor 22 can generate baseband transmission signals including data using various types of digital signal processing, such as modulation, and output the baseband transmission signals to the wireless communication module 11.

Hereinafter, the receiving processors 21a and 21b are each referred to as a "receiving processor 21" unless there is a need to particularly distinguish between them. The reception signals 30a and 30b are each referred to as "reception signals 30" unless there is a need to particularly distinguish between them.

The receiving processors 21 can perform processing to acquire data that is included in reception signals received by the antennas 110 and is transmitted in accordance with LTE and processing to acquire data that is included in the reception signals and is transmitted in accordance with 1×. The former processing is referred to as "LTE receiving processing", and the latter processing is referred to as "1× receiving processing". The data transmitted in accordance with LTE is referred to as "LTE data", and the data transmitted in accordance with 1× is referred to as "1× data".

In LTE receiving processing, the receiving processors 21 can perform digital signal processing in accordance with LTE on the reception signals 30 as input to acquire the LTE data included in the reception signals 30. The reception signals 30 including the LTE data are orthogonal frequency division multiplexing (OFDM) signals, and thus a discrete Fourier transform (DFT) and the like are applied to the reception signals 30 in LTE receiving processing.

In 1× receiving processing, the receiving processors 21 can perform digital signal processing in accordance with 1× on the reception signals 30 as input to acquire the 1× data included in the reception signals 30. The reception signals 30 including the 1× data have undergone spread spectrum, and thus multiplication of spreading codes (despreading) and the like are performed on the reception signals 30 in 1× receiving processing.

In the wireless communication apparatus 1, LTE receiving processing is processing to acquire the LTE data included in the reception signals received by the antennas 110. This means that LTE receiving processing is processing to perform digital receiving processing, such as demodulation, in accordance with LTE on the reception signals 30 to acquire the LTE data included in the reception signals 30. Thus, in a case where a transmission channel between the wireless communication apparatus 1 and the base station 2 capable of performing LTE communication is in a bad condition or in a case where the wireless communication apparatus 1 is out of range of LTE communication, the LTE data may not be acquired even if LTE receiving processing is performed.

Similarly, 1× receiving processing is processing to acquire the 1× data included in the reception signals received by the antennas 110. This means that 1× receiving processing is processing to perform digital receiving processing in accordance with 1× on the reception signals 30 to acquire the 1× data included in the reception signals 30. Thus, in a case where a transmission channel between the wireless communication apparatus 1 and the base station 2 capable of performing 1× communication is in a bad condition or in a case where the wireless communication apparatus 1 is out of range of 1× communication, the 1× data may not be acquired even if 1× receiving processing is performed.

In a case where the wireless communication apparatus 1 performs transmission in accordance with LTE, the transmitting processor 22 applies an inverse DFT (IDFT) and the like to generate transmission signals (OFDM signals) in accordance with LTE, and outputs the transmission signals to the wireless communication module 11. In a case where the wireless communication apparatus 1 performs transmission in accordance with 1×, the transmitting processor 22 generates transmission signals (spread spectrum signals) in accordance with 1×, and outputs the transmission signals to the wireless communication module 11.

The wireless communication apparatus 1, which has configuration as described above, can perform data communication and voice communication. Specifically, the wireless communication apparatus 1 can perform data communication with the server apparatus 4 and the like connected to the network 3 through the base station 2 and the network 3. The wireless communication apparatus 1 also can perform data communication with another mobile phone through the base station 2 and the network 3. Furthermore, the wireless communication apparatus 1 can perform voice communication with another mobile phone through the base station 2 and the network 3 with use of the microphone 14, the speaker 15, and the like. In the wireless communication system 100, data communication can be performed in accordance with both LTE and 1×. On the other hand, voice communication can be performed in accordance with only 1× from among LTE and 1×. In a case where the base station 2 transmits signals using a multi-input multi-output (MIMO) scheme, the wireless communication apparatus 1 receives the signals from the base station 2 using the two antennas 110a and 110b. In a case where the wireless communication apparatus 1 is within range of both LTE communication and 1× communication when performing data communication, LTE takes priority over 1× to perform communication.

<Receiving Processing Performed by Wireless Communication Apparatus>

In a case where the wireless communication apparatus 1 does not perform voice communication, and performs reception in accordance with LTE using the two antennas 110a and 110b, the wireless communication apparatus 1 intermittently performs reception in accordance with 1× using one of the antennas 110 to receive notification of an incoming call to indicate a call from another mobile phone in voice communication. Specifically, in a case where the receiving processors 21a and 21b perform LTE receiving processing in the data processor 20 of the wireless communication apparatus 1, one of the receiving processors 21 intermittently performs 1× receiving processing in place of LTE receiving processing. In the wireless communication apparatus 1, the receiving processor 21b intermittently performs 1× receiving processing in place of LTE receiving processing, for example. Thus, in a case where the wireless communication apparatus 1 performs reception in accordance with LTE using the two antennas 110a and 110b, the antenna 110b corresponding to the receiving processor 21b is shared between reception performed in accordance with LTE and reception performed in accordance with 1×. Instead of the receiving processing module 21b, the receiving processor 21a may intermittently perform 1× receiving processing in place of LTE receiving processing. An operating mode of the data processor 20 in which the receiving processor 21b intermittently performs 1× receiving processing in place of LTE receiving processing in a case where the receiving processors 21a and 21b perform LTE receiving processing is hereinafter referred to as a "1× intermittent reception mode". In the wireless communication apparatus 1, the data processor 20 can operate in the 1× intermittent reception mode both in a case where the wireless communication apparatus 1 is within range of 1× communication and in a case where the wireless communication apparatus 1 is out of range of 1× communication.

The 1× intermittent reception mode includes two types of operating modes, namely a first 1× intermittent reception mode and a second 1× intermittent reception mode. In the second 1× intermittent reception mode, the receiving processor 21b intermittently performs 1× receiving processing at intervals longer than intervals in the first 1× intermittent reception mode. The data processor 20 may basically operate in the first 1× intermittent reception mode when operating in the 1× intermittent reception mode. Exceptionally, the data processor 20 may operate in the second 1× intermittent reception mode when acquiring a predetermined type of data that is included in the reception signals 30 and is transmitted in accordance with LTE. The predetermined type of data is hereinafter referred to as "particular data". An example of the particular data includes data on which retransmission control is not performed.

Figure 4:
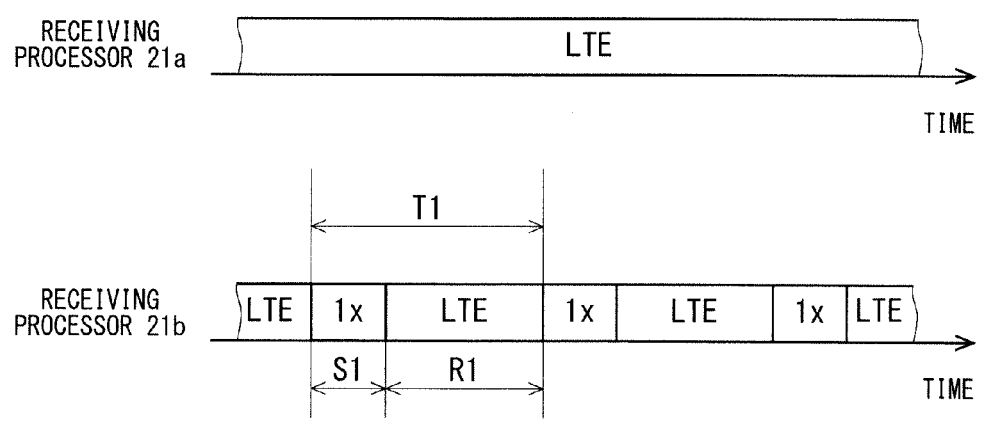
FIG. 4 illustrates an example of a first 1× intermittent reception mode.
Figure 5:
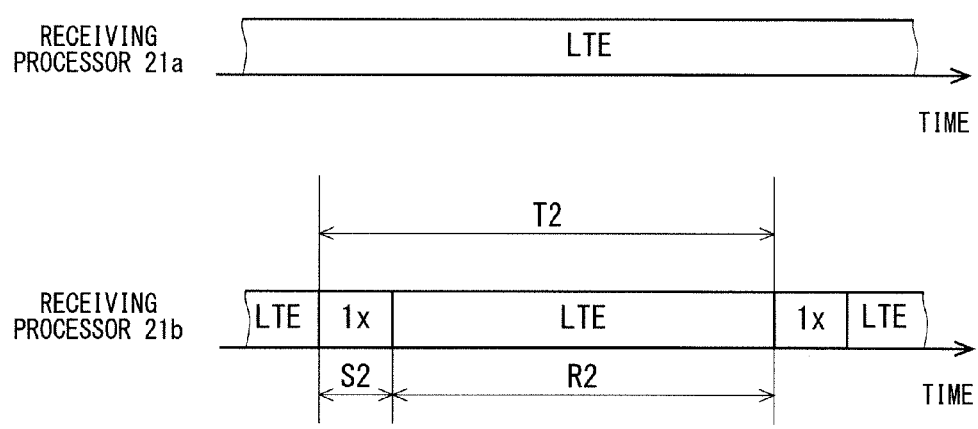
FIG. 5 illustrates an example of a second 1× intermittent reception mode.

FIG. 4 illustrates the first 1× intermittent reception mode in a case where the wireless communication apparatus 1 is within range of 1× communication. FIG. 5 illustrates the second 1× intermittent reception mode in a case where the wireless communication apparatus 1 is within range of 1× communication. In FIGS. 4 and 5, and FIGS. 6 and 7, which are described below, periods indicated by "LTE" represent periods in which LTE receiving processing is performed, and periods indicated by "1×" represent periods in which 1× receiving processing is performed.

As illustrated in FIGS. 4 and 5, in a case where the data processor 20 operates in the 1× intermittent reception mode, the receiving processor 21a always performs LTE receiving processing, and the receiving processor 21b intermittently performs 1× receiving processing in place of LTE receiving processing. This means that the receiving processor 21b alternately performs LTE receiving processing and 1× receiving processing. If the receiving processor 21b acquires data that is included in the reception signals received by the antenna 110b and indicates notification of an incoming call in 1× receiving processing, the controller 10 controls the display 13 and the like so that the user is notified of the call from another mobile phone. If the user performs a response operation to respond to the call from the other mobile phone by operating the display surface of the display 13, the wireless communication apparatus 1 terminates reception performed in accordance with LTE (the data processor 20 terminates the 1× intermittent reception mode), and performs 1× communication (voice communication) using the two antennas 110a and 110b.

The data indicating notification of the incoming call (hereinafter, referred to as "incoming call notification data") can be transmitted from the base station 2 capable of performing 1× communication on a paging channel. The base station 2 can transmit data on the paging channel periodically. In a case where the wireless communication apparatus 1 is within range of 1× communication, the wireless communication apparatus 1 is synchronized with the base station 2 capable of performing 1× communication, and thus understands a cycle of transmission of data on the paging channel from the base station 2. In the case of operating in the 1× intermittent reception mode, the data processor 20 intermittently performs 1× receiving processing in accordance with the cycle of transmission of data on the paging channel from the base station 2 capable of communicating with the wireless communication apparatus 1 and performing 1× communication.

The data processor 20 operates in the second 1× intermittent reception mode illustrated in FIG. 5 when acquiring the particular data that is included in the reception signals 30 and is transmitted in accordance with LTE. On the other hand, the data processor 20 operates in the first 1× intermittent reception mode illustrated in FIG. 4 when acquiring LTE data, other than the particular data, that is included in the reception signals 30 and is transmitted in accordance with LTE. As illustrated in FIGS. 4 and 5, an interval (a cycle) T2 at which the receiving processor 21b intermittently performs 1× receiving processing in the second 1× intermittent reception mode is longer than an interval (a cycle) T1 at which the receiving processor 21b intermittently performs 1× receiving processing in the first 1× intermittent reception mode. In the example of FIGS. 4 and 5, the interval T2 is twice the length of the interval T1. In the first 1× intermittent reception mode, a period S1 in which 1× receiving processing is performed is constant, and a period R1 in which LTE receiving processing is performed is constant. In the second 1× intermittent reception mode, a period S2 in which 1× receiving processing is performed is constant, and a period R2 in which LTE receiving processing is performed is constant. The periods S1 and S2 are equal to each other. The period R2 becomes longer than the period R1 as the interval T2 becomes longer than the interval T1.

Figure 6:
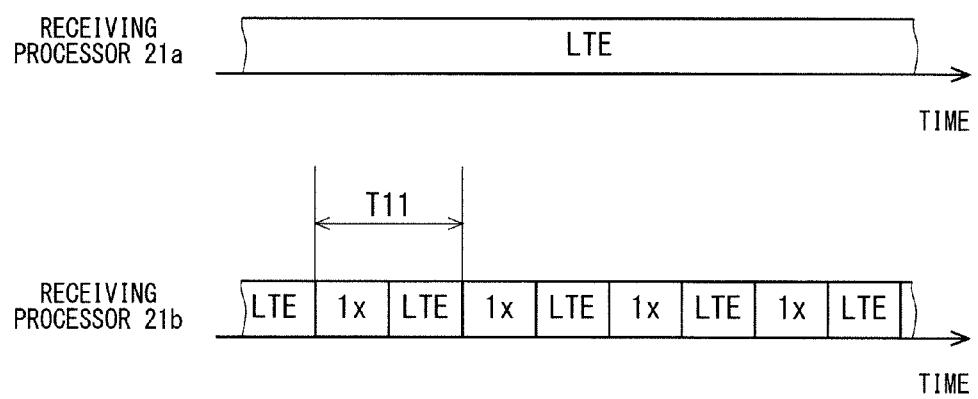
FIG. 6 illustrates an example of the first 1× intermittent reception mode.
Figure 7:
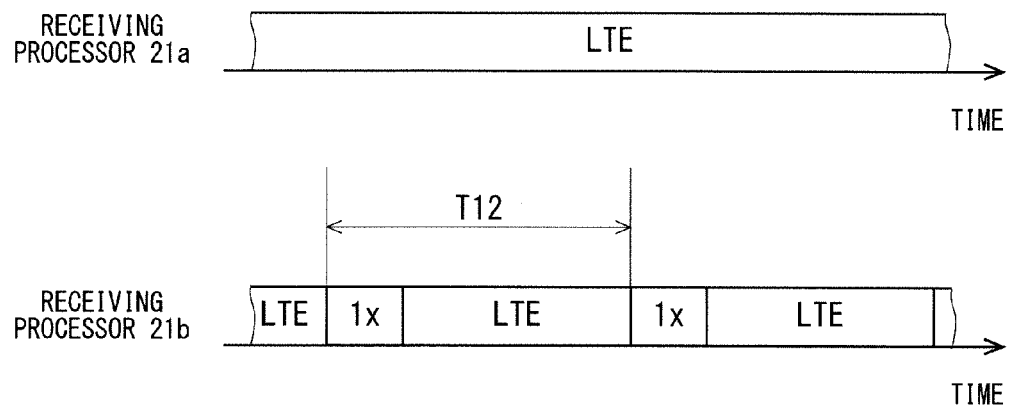
FIG. 7 illustrates an example of the second 1× intermittent reception mode.

FIG. 6 illustrates the first 1× intermittent reception mode in a case where the wireless communication apparatus 1 is out of range of 1× communication. FIG. 7 illustrates the second 1× intermittent reception mode in a case where the wireless communication apparatus 1 is out of range of 1× communication. In a case where the wireless communication apparatus 1 is out of range of 1× communication, the wireless communication apparatus 1 is not synchronized with the base station 2 capable of performing 1× communication. The wireless communication apparatus 1 thus does not understand the cycle of transmission of data on the paging channel. Thus, in a case where the wireless communication apparatus 1 is out of range of 1× communication, 1× receiving processing is performed in the 1× intermittent reception mode at intervals shorter than intervals in a case where the wireless communication apparatus 1 is within range of 1× communication.

Comparison between FIGS. 4 and 6 indicates that, in the first 1× intermittent reception mode, an interval T11 at which 1× receiving processing is performed in a case where the wireless communication apparatus 1 is out of range of 1× communication is shorter than the interval T1 at which 1× receiving processing is performed in a case where the wireless communication apparatus 1 is within range of 1× communication. Comparison between FIGS. 5 and 7 indicates that, in the second 1× intermittent reception mode, an interval T12 at which 1× receiving processing is performed in a case where the wireless communication apparatus 1 is out of range of 1× communication is shorter than the interval T2 at which 1× receiving processing is performed in a case where the wireless communication apparatus 1 is within range of 1× communication. In the example of FIGS. 6 and 7, the interval T12 is twice the length of the interval T11. In a case where the wireless communication apparatus 1 is out of range of 1× communication, the period in which 1× receiving processing is performed in the first 1× intermittent reception mode and the period in which 1× receiving processing is performed in the second 1× intermittent reception mode are equal to each other.

As described above, in the 1× intermittent reception mode, the receiving processor 21a always performs LTE receiving processing, whereas the receiving processor 21b intermittently performs 1× receiving processing in place of LTE receiving processing to receive notification of an incoming call. The receiving processor 21b cannot acquire the LTE data while performing 1× receiving processing. In the case of operating in the 1× intermittent reception mode, the data processor 20 may thus not be able to acquire part of the LTE data from the base station 2.

The data processor 20 has the second 1× intermittent reception mode in which 1× receiving processing is performed at intervals longer than intervals in the first 1× intermittent reception mode. The data processor 20 can operate in the second 1× intermittent reception mode as necessary to suppress failure to acquire the part of the LTE data from the base station 2. This means that the data processor 20 can properly acquire the LTE data included in the reception signals received by the antenna 110b.

<Processing to Receive Particular Data>

Figure 8:
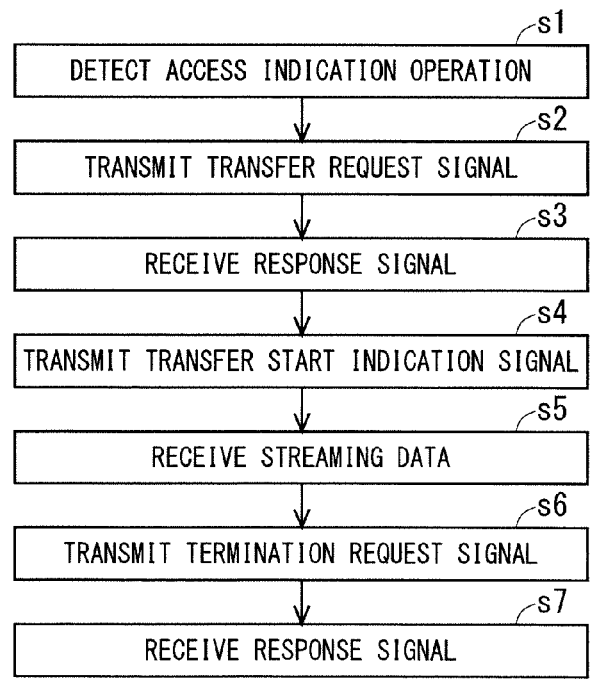
FIG. 8 illustrates an example of a flowchart showing operation of the wireless communication apparatus.

An example of the data on which retransmission control is not performed for use as the particular data includes streaming data transmitted using the User Datagram Protocol (UDP). Retransmission control is not performed on the streaming data transmitted using the UDP, and thus, if the wireless communication apparatus 1 cannot properly receive part of the streaming data, the part of the streaming data is not retransmitted to the wireless communication apparatus 1. Operation of the wireless communication apparatus 1 performed when the wireless communication apparatus 1 receives the streaming data transmitted using the UDP by the server apparatus 4 connected to the network 3 is described below. FIG. 8 illustrates a flowchart showing the operation. The wireless communication apparatus 1 communicates with the server apparatus 4 using the Real Time Streaming Protocol (RTSP).

As illustrated in FIG. 8, when the touch panel 12 detects an access indication operation, such as an operation to input a uniform resource locator (URL), to indicate access to streaming data stored in the server apparatus 4 in step s1, the wireless communication apparatus 1 transmits a transfer request signal requesting the start of transfer of the streaming data to the server apparatus 4 in step s2. The transfer request signal is referred to as the "PLAY method" in the RTSP.

When the wireless communication apparatus 1 then receives a response signal from the server apparatus 4 in step s3, the wireless communication apparatus 1 transmits a transfer start indication signal indicating the start of transfer of the streaming data to the server apparatus 4 in step s4. Upon receiving the transfer start indication signal, the server apparatus 4 transmits the streaming data using the UDP. The streaming data transmitted by the server apparatus 4 is transmitted to the wireless communication apparatus 1 through the base station 2.

In step s5, the wireless communication apparatus 1 receives, using the antennas 110a and 110b, the streaming data wirelessly transmitted through the base station 2. In this case, the data processor 20 operates in the second 1× intermittent reception mode, and acquires the streaming data included in the reception signals. The wireless communication apparatus 1 plays back the received streaming data, and displays the streaming data on the display 13, for example.

In order to terminate communication with the server apparatus 4, in step s6, the wireless communication apparatus 1 transmits a termination request signal requesting termination of the communication to the server apparatus 4. The termination request signal is referred to as the "TEAR-DOWN method" in the RTSP. The wireless communication apparatus 1 then receives a response signal from the server apparatus 4 in step s7.

As described above, the data processor 20 operates in the second 1× intermittent reception mode when acquiring the LTE data which is included in the reception signals and on which retransmission control is not performed. The LTE data on which retransmission control is not performed is not retransmitted even if the wireless communication apparatus 1 cannot properly acquire the LTE data, and thus the receiving processor 21b cannot acquire the LTE data received by the antenna 110b during a period in which 1× receiving processing is performed. In the wireless communication apparatus 1, the data processor 20 operates in the second 1× intermittent reception mode in which 1× receiving processing is performed at longer intervals, and thus failure to acquire the LTE data on which retransmission control is not performed can be suppressed.

Although the data on which retransmission control is not performed is used as the particular data in the above-mentioned example, other types of data may be used. For example, a file (data) having a data size equal to or larger than a threshold or a data size larger than the threshold may be used. In a case where retransmission control is performed on a file, the data processor 20 operates in the second 1× intermittent reception mode in which 1× receiving processing is performed at longer intervals when the wireless communication apparatus 1 receives a file having a large data size. As a result, time required for acquisition (download) of the file can be reduced.

The particular data may be designated by the user. For example, the user can designate the particular data using a predetermined screen displayed on the display surface of the display 13. FIG. 9 illustrates an example of a designation screen 200 for the user to designate the particular data. In the example of FIG. 9, the user can designate, as the particular data, streaming data, a file having a data size equal to or larger than a threshold or a data size larger than the threshold, and the like using the designation screen 200. The user can designate the particular data by selecting any of selection buttons 201 shown in the designation screen 200 with a finger and the like. In the example of FIG. 9, streaming data has been designated as the particular data.

The data processor 20 may operate in an operating mode selected by the user. FIG. 10 illustrates a flowchart showing operation of the wireless communication apparatus 1 in this case. FIG. 10 illustrates operation of the wireless communication apparatus 1 performed when the wireless communication apparatus 1 receives the streaming data transmitted using the UDP by the server apparatus 4, as in FIG. 8.

As illustrated in FIG. 10, the wireless communication apparatus 1 performs the above-mentioned processing in steps s1 to s3. Upon receiving the response signal in step s3, the wireless communication apparatus 1 displays a selection screen 300 for the user to select the operating mode of the data processor 20 in step s11. FIG. 11 illustrates an example of the selection screen 300 displayed on the display surface of the display 13. The selection screen 300 illustrated in FIG. 11 includes two buttons 301 and 302. If the button 301 is selected, the second 1× intermittent reception mode is selected, and, if the button 302 is selected, the first 1× intermittent reception mode is selected.

When the touch panel 12 detects an operation performed by the user to select the button 301 included in the selection screen 300 with a finger and the like in step s12, the controller 10 determines the operating mode of the data processor 20 as the second 1× intermittent reception mode in step s13. On the other hand, when the touch panel 12 detects an operation performed by the user to select the button 302 included in the selection screen 300 with the finger and the like, the controller 10 determines the operating mode of the data processor 20 as the first 1× intermittent reception mode in step s14.

When processing in step s13 or s14 is performed, the wireless communication apparatus 1 performs the above-mentioned processing in step s4. The wireless communication apparatus 1 then receives the streaming data transmitted from the server apparatus 4 in step s5. In this case, the data processor 20 operates in the operating mode selected by the user in step s12. After performing processing in step s5, the wireless communication apparatus 1 performs the above-mentioned processing in steps s6 and s7.

Although the selection screen 300 is displayed on the display 13 when the data processor 20 acquires the particular data included in the reception signals in the above-mentioned example, the selection screen 300 may be displayed on the display 13 regardless of the type of data acquired by the data processor 20. For example, the selection screen 300 may be displayed on the display 13 when the user performs a predetermined operation on the display surface of the display 13 regardless of whether the wireless communication apparatus 1 is performing LTE communication.

The data processor 20 may have, in place of the second 1× intermittent reception mode, an LTE reception mode in which the receiving processors 21a and 21b do not perform 1× receiving processing. In the LTE reception mode, the receiving processors 21a and 21b perform only LTE receiving processing from among LTE receiving processing and 1× receiving processing. In a case where the data processor 20 has the LTE reception mode in place of the second 1× intermittent reception mode, in the above-mentioned processing in step s5, the data processor 20 operates in the LTE reception mode, and acquires the streaming data included in the reception signals. When the touch panel 12 detects the operation performed by the user to select the button 301 included in the selection screen 300 with the finger and the like in the above-mentioned processing in step s12, the controller 10 determines the operating mode of the data processor 20 as the LTE reception mode in step s13.

The data processor 20 may have the LTE reception mode in addition to the first and second 1× intermittent reception modes. In this case, the user may be allowed to select the operating mode of the data processor 20 from the first and second 1× intermittent reception modes and the LTE reception mode using the selection screen 300. If the user selects the LTE reception mode as the operating mode of the data processor 20 using the selection screen 300, the display 13 may display a screen for asking the user if it is acceptable to operate in the LTE reception mode while displaying the fact that notification of an incoming call cannot be received in the LTE reception mode. The user can notify the wireless communication apparatus 1 of whether to accept operation in the LTE reception mode or not using the screen.

The controller 10 may determine whether the data processor 20 operates in the second 1× intermittent reception mode or in the LTE reception mode in accordance with the type of the particular data. For example, the controller 10 sets the operating mode of the data processor 20 as the LTE operating mode when the data which is included in the reception signals 30 and on which retransmission control is not performed is acquired. The controller 10 sets the operating mode of the data processor 20 as the second 1× intermittent reception mode when the file included in the reception signals 30 and having the large data size is acquired.

The data processor 20 cannot acquire the incoming call notification data transmitted from the base station 2 capable of performing 1× communication while operating in the LTE reception mode. On the other hand, the base station 2 capable of performing 1× communication transmits data indicating a missed call (hereinafter, referred to as "missed call data") when the base station 2 cannot receive a response signal to the transmitted incoming call notification data. The base station 2 repeatedly transmits the missed call data until the base station 2 receives a response signal to the missed call data. In a case where the base station 2 has transmitted the incoming call notification data to the wireless communication apparatus 1 when the data processor 20 operates in the LTE reception mode, the data processor 20 acquires the missed call data included in the reception signals 30 when the operating mode of the data processor 20 changes from the LTE reception mode to the 1× intermittent reception mode. When the data processor 20 receives the missed call data included in the reception signals 30, the wireless communication apparatus 1 may cause the display 13 to display a figure representing the missed call. This figure is hereinafter referred to as a "first missed call figure".

As described above, in a case where the data processor 20 has acquired the incoming call notification data included in the reception signals when operating in the 1× intermittent reception mode, the controller 10 controls the display 13 and the like so that the user is notified of the call from another mobile phone. If the user does not perform an operation to respond to the notification on the display surface of the display 13, the display 13 displays a figure representing the missed call. This figure is hereinafter referred to as a "second missed call figure". The display 13 may display the above-mentioned first missed call figure in a different manner from the second missed call figure. For example, the display 13 may display a figure different from the second missed call figure as the first missed call figure.

Although the receiving processor 21b intermittently performs 1× receiving processing to receive data indicating notification of an incoming call in the above-mentioned example, the receiving processor 21b may intermittently perform 1× receiving processing to receive another type of data.

The wireless communication apparatus 1 may perform communication in accordance with another wireless communication scheme instead of performing LTE communication. The wireless communication apparatus 1 may perform communication in accordance with Wireless Fidelity (WiFi) or Worldwide Interoperability for Microwave Access (Wi-MAX), for example, instead of performing LTE communication. The wireless communication apparatus 1 may perform communication in accordance with another wireless communication scheme instead of performing 1× communication. The wireless communication apparatus 1 may perform communication in accordance with wideband code division multiple access (W-CDMA), for example, instead of performing 1× communication.

While the wireless communication apparatus 1 has been described above in detail, the foregoing description is in all aspects illustrative and not restrictive. Various modifications described above may be combined with one another unless any contradiction occurs. It is understood that numerous modifications that have not been described can be devised without departing from the scope of the present disclosure.

The invention claimed is:

1. A wireless communication apparatus configured to perform communication according to both a first wireless communication scheme and a second wireless communication scheme, the wireless communication apparatus comprising:
    an antenna shared between reception performed in accordance with the first wireless communication scheme and reception performed in accordance with the second wireless communication scheme; and
    a data processor configured to perform first processing to acquire first data included in first reception signals received by the antenna and transmitted in accordance with the first wireless communication scheme, and second processing to acquire second data included in second reception signals and transmitted in accordance with the second wireless communication scheme,
    wherein the data processor has a first operating mode and a second operating mode,
    wherein, in the first operating mode, the second processing is performed alternately with the first processing according to a first interval, and
    wherein, in the second operating mode, the second processing is performed alternately with the first processing according to a second interval that longer than the first interval.

2. The wireless communication apparatus according to claim 1, wherein the data processor operates in the second operating mode when acquiring first data of a predetermined type.

3. The wireless communication apparatus according to claim 2, wherein the predetermined type of data comprises data on which retransmission control is not performed.

4. The wireless communication apparatus according to claim 2, wherein the predetermined type of data comprises data having a size equal to or larger than a threshold or a size larger than the threshold.

5. The wireless communication apparatus according to claim 2, wherein the predetermined type of data is designated by a user.

6. The wireless communication apparatus according to claim 1, wherein the data processor operates in one of the first operating mode and second operating mode selected by a user.

7. The wireless communication apparatus according to claim 6, further comprising a display configured to display a selection screen for the user to select the one operating mode.

8. The wireless communication apparatus according to claim 7, wherein the display displays the selection screen when the data processor acquires first data of the predetermined type.

9. The wireless communication apparatus according to claim 8, wherein the predetermined type of data comprises data on which retransmission control is not performed.

10. The wireless communication apparatus according to claim 8, wherein the predetermined type of data comprises data having a size equal to or larger than a threshold or a size larger than the threshold.

11. The wireless communication apparatus according to claim 8, wherein the predetermined type of data is designated by the user.

12. A wireless communication apparatus performing communication in accordance with a first wireless communication scheme and communication in accordance with a second wireless communication scheme, the wireless communication apparatus comprising:
   an antenna shared between reception performed in accordance with the first wireless communication scheme and reception performed in accordance with the second wireless communication scheme; and
   a data processor configured to perform first processing to acquire data that is included in first reception signals received by the antenna and is transmitted in accordance with the first wireless communication scheme and second processing to acquire data that is included in second reception signals and is transmitted in accordance with the second wireless communication scheme,
wherein the data processor has a first operating mode and a second operating mode as operating modes in a case where the wireless communication apparatus is one of within and out of range of the second wireless communication scheme, the first operating mode being a mode in which, when the first processing is performed, the second processing is intermittently performed in place of the first processing, the second operating mode being a mode in which, when the first processing is performed, the second processing is intermittently performed in place of the first processing at intervals longer than intervals in the first operating mode
a second antenna, wherein when operating in the first and second operating modes, the data processor performs processing to acquire data that is included in the first reception signals received by the second antenna and is transmitted in accordance with the first wireless communication scheme, and does not perform processing to acquire data that is included in the second reception signals received by the second antenna and is transmitted in accordance with the second wireless communication scheme.

13. A wireless communication method comprising:
receiving a first reception signal in accordance with a first wireless communication scheme or a second reception signal in accordance with a second wireless communication scheme;
in a first operating mode, performing second processing alternately with first processing according to a first interval, wherein the first processing acquires data included in the first reception signal, and wherein the second processing acquires data that is included in the second reception signal; and,
in a second operating mode, performing the second processing alternately with the first processing according to a second interval that is longer than the first interval.

\* \* \* \* \*